US008841597B2

(12) United States Patent
Costello et al.

(10) Patent No.: US 8,841,597 B2
(45) Date of Patent: Sep. 23, 2014

(54) HOUSING FOR OPTICAL PROXIMITY SENSOR

(75) Inventors: James Costello, Singapore (SG); Wee Sin Tan, Singapore (SG); Kai Koon Lee, Singapore (SG); Rani Saravanan, Singapore (SG)

(73) Assignee: Avago Technologies IP (Singapore) Pte. Ltd., Singapore (SG)

( * ) Notice: Subject to any disclaimer, the term of this patent is extended or adjusted under 35 U.S.C. 154(b) by 777 days.

(21) Appl. No.: 12/979,071

(22) Filed: Dec. 27, 2010

(65) Prior Publication Data

US 2012/0160994 A1 Jun. 28, 2012

(51) Int. Cl.
*H01J 40/14* (2006.01)
*H05K 5/02* (2006.01)
*G01J 5/20* (2006.01)

(52) U.S. Cl.
USPC ...... 250/221; 250/239; 250/338.4; 250/341.1

(58) Field of Classification Search
USPC ........ 250/221, 222.1, 239, 338.1, 338.4, 340, 250/341.1, 336.1; 257/723, 724, 678; 345/175, 173; 178/18.01, 18.03, 18.09
See application file for complete search history.

(56) References Cited

U.S. PATENT DOCUMENTS

| 5,155,777 | A |   | 10/1992 | Angelopoulos et al. |
|---|---|---|---|---|
| 5,367,393 | A |   | 11/1994 | Ohara et al. |
| 5,567,953 | A | * | 10/1996 | Horinouchi et al. .......... 250/551 |
| 5,675,143 | A |   | 10/1997 | Heimlicher |
| 5,760,390 | A | * | 6/1998 | Vezzalini et al. ............. 250/221 |
| 5,811,797 | A | * | 9/1998 | Kobachi et al. ............... 250/239 |
| 6,064,062 | A |   | 5/2000 | Bohn |
| 6,135,816 | A |   | 10/2000 | Mashiyama et al. |
| 6,180,881 | B1 |   | 1/2001 | Isaak |
| 6,364,706 | B1 |   | 4/2002 | Ando et al. |
| 6,572,410 | B1 |   | 6/2003 | Volstorf et al. |
| 6,635,955 | B2 |   | 10/2003 | Scheidle |
| 6,674,653 | B1 |   | 1/2004 | Valentine |
| 6,677,934 | B1 | * | 1/2004 | Blanchard ...................... 345/175 |
| 6,740,862 | B2 | * | 5/2004 | Paritsky et al. ............... 250/221 |
| 6,771,671 | B1 |   | 8/2004 | Fields et al. |
| 6,855,933 | B2 | * | 2/2005 | Stone et al. ................. 250/341.8 |
| 6,885,300 | B1 |   | 4/2005 | Johnston et al. |

(Continued)

FOREIGN PATENT DOCUMENTS

CN 1832217 9/2006
CN 1743886 3/2008

(Continued)

OTHER PUBLICATIONS

Costello et al., U.S. Appl. No. 12/495,739, Entitled "Optical Proximity Sensor Package With Molded Infrared Light Rejection Barrier and Infrared Light Pass Components", filed Jun. 30, 2009, 33 pages.

(Continued)

*Primary Examiner* — John Lee (57) ABSTRACT

An optical proximity sensor and housing for the same are disclosed. The housing is provided with at least two support structures and at least two modules. A first of the support structures transfers vertical forces applied to one end of a module to an opposite end of the opposite module. A second of the support structures inhibits a pivoting of the modules about the first support structure.

20 Claims, 6 Drawing Sheets

(56) References Cited

U.S. PATENT DOCUMENTS

| | | | |
|---|---|---|---|
| 7,026,710 B2 | 4/2006 | Coyle et al. | |
| 7,109,465 B2 | 9/2006 | Kok et al. | |
| 7,172,126 B2 | 2/2007 | Schmidt et al. | |
| 7,229,295 B2 | 6/2007 | Ice et al. | |
| 7,256,483 B2 | 8/2007 | Eppler et al. | |
| 7,258,264 B2 | 8/2007 | Ice et al. | |
| 7,277,012 B2 | 10/2007 | Johnston et al. | |
| 7,289,142 B2 | 10/2007 | Silverbrook | |
| 7,348,536 B2* | 3/2008 | Bockel et al. | 250/221 |
| 7,387,033 B2 | 6/2008 | Qing et al. | |
| 7,387,907 B2 | 6/2008 | Hsu et al. | |
| 7,427,806 B2 | 9/2008 | Arndt et al. | |
| 7,485,818 B2* | 2/2009 | Chou | 200/61.52 |
| 7,510,888 B2 | 3/2009 | Guenther et al. | |
| 7,514,666 B2 | 4/2009 | Yee et al. | |
| 7,675,132 B2 | 3/2010 | Waitl et al. | |
| 7,755,029 B2* | 7/2010 | Tang et al. | 250/239 |
| 7,767,485 B2 | 8/2010 | Ogawa et al. | |
| 8,026,472 B2* | 9/2011 | Arnold | 250/221 |
| 8,031,174 B2 | 10/2011 | Hamblin et al. | |
| 8,097,852 B2* | 1/2012 | Yao | 250/339.01 |
| 8,143,608 B2* | 3/2012 | Yao et al. | 250/551 |
| 8,207,517 B2* | 6/2012 | Wang et al. | 250/551 |
| 8,275,922 B2 | 9/2012 | Barrett et al. | |
| 8,420,999 B2* | 4/2013 | Costello et al. | 250/221 |
| 8,575,537 B2* | 11/2013 | Yao et al. | 250/221 |
| 2002/0172472 A1 | 11/2002 | Nelson et al. | |
| 2004/0065894 A1 | 4/2004 | Hashimoto et al. | |
| 2005/0110157 A1 | 5/2005 | Sherrer et al. | |
| 2005/0199786 A1* | 9/2005 | Yoshida et al. | 250/221 |
| 2006/0016994 A1 | 1/2006 | Basoor et al. | |
| 2006/0017069 A1 | 1/2006 | Bergmann | |
| 2006/0022212 A1 | 2/2006 | Waitl et al. | |
| 2006/0022215 A1 | 2/2006 | Arndt et al. | |
| 2006/0045530 A1 | 3/2006 | Lim et al. | |
| 2006/0049533 A1 | 3/2006 | Kamoshita | |
| 2006/0118807 A1 | 6/2006 | Ives et al. | |
| 2007/0045524 A1 | 3/2007 | Rains et al. | |
| 2007/0072321 A1 | 3/2007 | Sherrer et al. | |
| 2007/0246646 A1 | 10/2007 | Lum et al. | |
| 2008/0006762 A1 | 1/2008 | Fadell et al. | |
| 2008/0011939 A1 | 1/2008 | Yee et al. | |
| 2008/0011940 A1 | 1/2008 | Zhang et al. | |
| 2008/0012033 A1 | 1/2008 | Arndt | |
| 2008/0030878 A1 | 2/2008 | Saxena et al. | |
| 2008/0049210 A1 | 2/2008 | Takaoka | |
| 2008/0116379 A1 | 5/2008 | Teder | |
| 2008/0118241 A1 | 5/2008 | TeKolste et al. | |
| 2008/0173790 A1* | 7/2008 | Cheng et al. | 250/206 |
| 2008/0173963 A1 | 7/2008 | Hsu et al. | |
| 2008/0179503 A1 | 7/2008 | Camargo et al. | |
| 2008/0197376 A1 | 8/2008 | Bert et al. | |
| 2008/0265266 A1 | 10/2008 | Bogner et al. | |
| 2008/0296478 A1 | 12/2008 | Hemoult | |
| 2008/0308738 A1 | 12/2008 | Li et al. | |
| 2008/0308917 A1 | 12/2008 | Pressel et al. | |
| 2009/0027652 A1 | 1/2009 | Chang et al. | |
| 2009/0057799 A1 | 3/2009 | Chan et al. | |
| 2009/0101804 A1 | 4/2009 | Phan Le | |
| 2009/0129783 A1 | 5/2009 | Ori et al. | |
| 2009/0159900 A1 | 6/2009 | Basoor | |
| 2010/0030039 A1 | 2/2010 | Lamego et al. | |
| 2010/0246771 A1 | 9/2010 | Hawver et al. | |
| 2010/0282951 A1 | 11/2010 | Costello et al. | |
| 2010/0327164 A1* | 12/2010 | Costello et al. | 250/338.1 |
| 2011/0024627 A1* | 2/2011 | Yao | 250/338.4 |
| 2011/0057102 A1* | 3/2011 | Yao | 250/338.1 |
| 2011/0057104 A1 | 3/2011 | Yao et al. | |
| 2011/0057129 A1* | 3/2011 | Yao et al. | 250/552 |
| 2011/0121181 A1* | 5/2011 | Costello et al. | 250/338.1 |
| 2011/0133941 A1* | 6/2011 | Yao et al. | 340/600 |
| 2011/0204233 A1* | 8/2011 | Costello et al. | 250/338.4 |
| 2011/0297831 A1 | 12/2011 | Yao et al. | |
| 2012/0070145 A1 | 3/2012 | Wong et al. | |
| 2012/0160994 A1* | 6/2012 | Costello et al. | 250/221 |

FOREIGN PATENT DOCUMENTS

| | | |
|---|---|---|
| EP | 1455564 | 9/2004 |
| JP | 11242926 | 9/1999 |
| JP | 2006-114737 | 4/2006 |
| JP | 2006-261380 | 9/2006 |
| JP | 2009032571 | 2/2009 |
| WO | WO-2006045531 | 5/2006 |
| WO | WO-2009/072786 | 6/2009 |
| WO | WO-2012068213 | 5/2012 |

OTHER PUBLICATIONS

Tan et al., U.S. Appl. No. 12/623,767, Entitled "Infrared Proximity Sensor Package With Improved Crosstalk Isolation", filed Nov. 23, 2009, 30 pages.

"A4 Masking Sheet—A4 Masking Sheet", Downloaded from website: <http://www.stix2.com.au/a4-masking-sheet-13/a4-masking-sheet.html> 2012, Product Description 2012.

"Altera 40/100 Gigabit Ethernet", *Altera Corporation Product Sheet* Copyright 1995-2012, 3 pages 2012.

"Altera's 10-Gbps Ethernet (XAUI) Solution", *Altera Corporation Product Sheet*, Copyright 1995-2012, 2 pages 2012.

"Nordson Ink-Dot I.D. System", *Nordson Corporation Product Sheet 2012*, 2 pages 2012.

"SerialLite II Protocol", *Altera Reference Manual Oct. 2005*, 84 pages 2005.

Morgavi, Paul , "Panasonic Print Head Technology and Market Applications", *IMI Europe*, Digital Printing Conferences 2007, Presentation, Nov. 7 to 9, 2007, 24 pages 2007.

"Agilent HSDL-9100 Miniature Surface-Mount Proximity Sensor Data Sheet", in current form on Dec. 21, 2007.

Avago Technologies, "APDS-9005 Miniature Surface-Mount Ambient Light Photo Sensor", Jan. 2007.

Avago Technologies, "APDS-9101—Integrated Reflective Sensor", Data Sheet 2007.

Avago Technologies, "APDS-9700 Signal Conditioning IC for Optical Proximity Sensors", Jan. 4, 2008.

Avago Technologies, "HSDL-9100—Surface-Mount Proximity Sensor", Data Sheet 2006.

Avago Technologies, "Integrated Ambient Light and Proximity Sensor Prelim Datasheet", APDS-9800 Mar. 2, 2009.

Avago Technologies, "Integrated Optical Proximity Sensors Prelim Datasheet", APDS-9120 Feb. 25, 2009.

AZ Optics, "Device Debuts as the World's Best-Performing Integrated Light/Proximity Sensor", Nov. 11, 2008.

Ides—The Plastic Web, "Si Photo Diode Chip", Dec. 19, 2007.

Ishihara, et al., "A Dual Face Package Using a Post with Wire Components: Novel Structure for PoP Wafer Level CSP and Compact Image Sensor Package", Electronic Components and Technology Conference 2008, 1093-1098.

Khamal, Ibrahim , "Infra-Red Proximity Sensor (II)", Apr. 4, 2008.

Losee, et al., "A 1/3 Format Image Sensor with Refractory Metal Light Shield for Color Video Applications", Solid State Circuits Conference, Digest of Technical Papers, 36th ISSCC, IEEE International Volume. Feb. 1989 , 90-91.

Nitto Denko Corporation, "Technical Data Sheet", NT-8506 2001.

Nitto Denko Corporation, "Technical Data Sheet", NT-MB-IRL3801 2008.

Penchem Technologies Data Sheet, "PEMCHEM OP 580", IR Filter Optoelectronic Epoxy Apr. 2009.

Penchem Technologies Data Sheet, "PENCHEM OP 579", IR Pass Optoelectronic Epoxy Apr. 2009.

Tyntek, "Data Sheet for AIGaAs/GaAs Infrared Chip", TK116IRA Nov. 2006.

Tyntek, "Data Sheet for AIGaAs/GaAs Infrared Chip", TK 114IRA Mar. 2004.

Tyntek, "Data Sheet for Si Photo-diode Chip", TK 043PD Jun. 2004.

Tyntek, "Si Photo-Diode Chip—TK043PD Data Sheet", Dec. 19, 2007.

Xydar, "G-930—Solvay Advanced Polymers—Liquid Crystal Polymer Data Sheet", reproduced from website at www.ides.com/grades/ds/E22219.htm on Dec. 17, 2007.

* cited by examiner

HOUSING FOR OPTICAL PROXIMITY SENSOR

FIELD OF THE DISCLOSURE

The present disclosure is generally directed toward optical proximity sensors and housings for the same.

BACKGROUND

Many types of optical proximity sensors are currently available. The design of such sensors will often depend upon the application in which the sensor is employed. Typical fields of application for optical proximity sensors include, without limitation, motion detection, controllers for computing devices (e.g., optical mouse, optical finger navigation, rollerball navigation, etc.), industrial applications, medical applications, transportation applications, computing applications, communications applications, aerospace applications, and so on.

Figure 1:
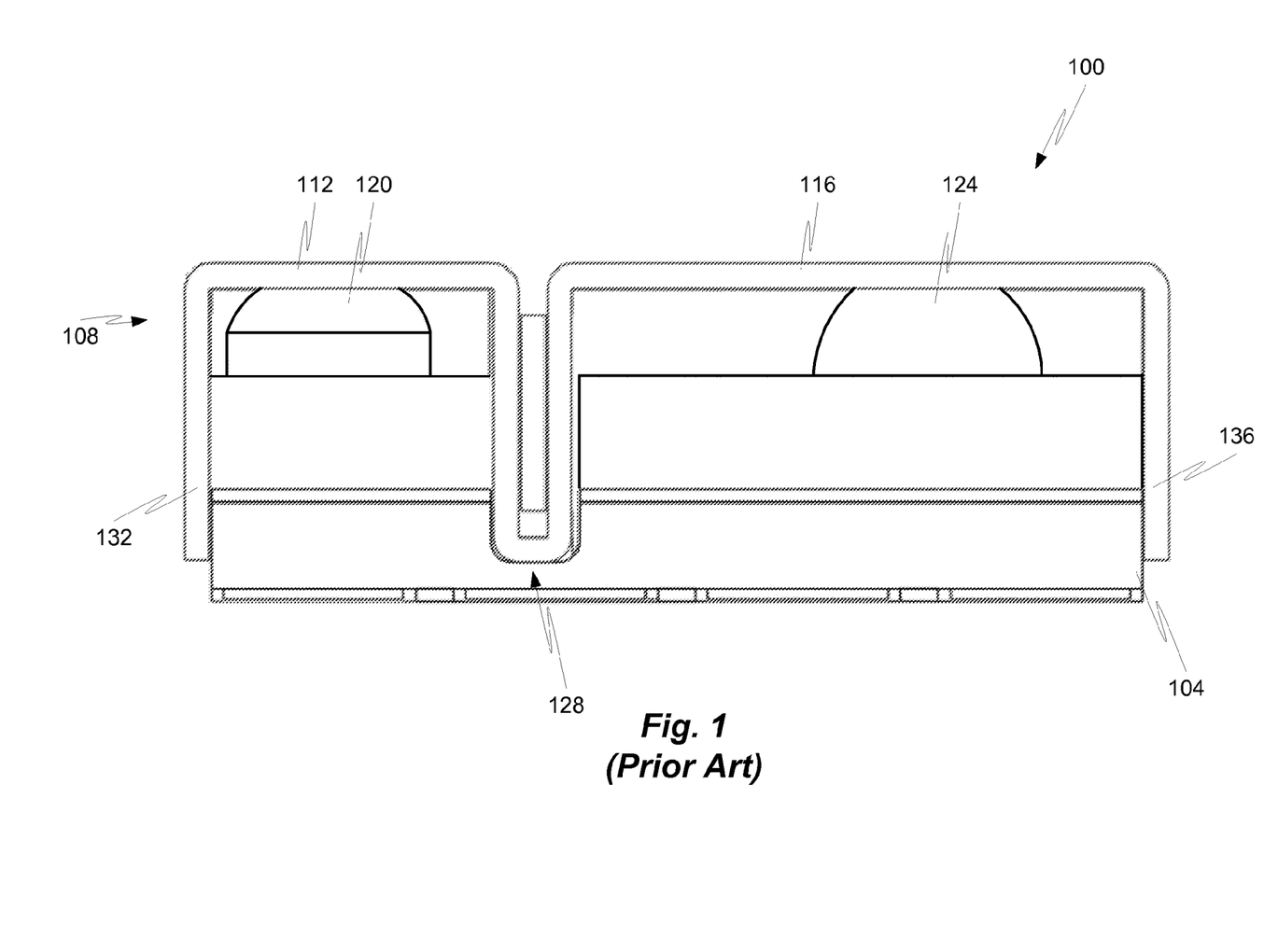
FIG. 1 is a cross-sectional side view of an optical proximity sensor in accordance with embodiments of the prior art.

As can be seen in FIG. 1, a typical optical proximity sensor 100 includes a substrate 104 upon which a light source 120 and a light detector 124 are mounted and housing 108 which provides a barrier between the light source 120 and light detector 124. The housing 108 may also serve a dual purpose of protecting the light source 120 and light detector 124 as well as other electronic components of the optical proximity sensor 100 from external forces.

In particular, the housing 108 may be designed to include a first module 112 and a second module 116. The first module 112 may include a top surface and four sidewalls which completely encapsulate or enclose the light source 120. Similarly, the second module 116 may include a top surface and four sidewalls which completely encapsulate or enclose the light detector 124. The sidewall of the first module 112 which is adjacent to the sidewall of the second module 116 may be referred to as the inner sidewall of each module 112, 116. In the embodiment depicted in FIG. 1, the inner sidewall of each module 112, 116 is used to form a u-bend feature 128 constructed of a folded material. The u-bend feature 128 serves two purposes. First, the u-bend feature 128 provides optical isolation between the light source 120 and light detector 124. Second, the u-bend feature 128 is a structural member which serves as an interface between the housing 108 and the substrate 104. More specifically, the u-bend feature 128 rests on the substrate 104 and is configured to convey vertical forces acting on the housing 108 laterally between modules 112, 116 as well as downwardly to the substrate 104. The u-bend feature 128 provides a mechanism for transferring and redirecting vertical forces imparted on the housing during fabrication or use.

Although not depicted in FIG. 1, the top surface of the first module 112 may comprise an aperture which allows light generated by the light source 120 to exit the housing 108 and reflect off of an object of interest. The top surface of the second module 116 may also comprise an aperture which allows light reflecting off of the object of interest (i.e., light originally emitted by the light source 120) to enter the cavity of the second module 116 and be detected by the light detector 124. The light detected by the light detector 124 may then be subsequently processed or analyzed according to the application in which the optical proximity sensor 100 is employed. In some instances, the light detected by the light detector 124 may be converted into x-y user-motion data that is subsequently converted into commands which control a pointer or cursor on a computational device's user interface.

Figure 2:
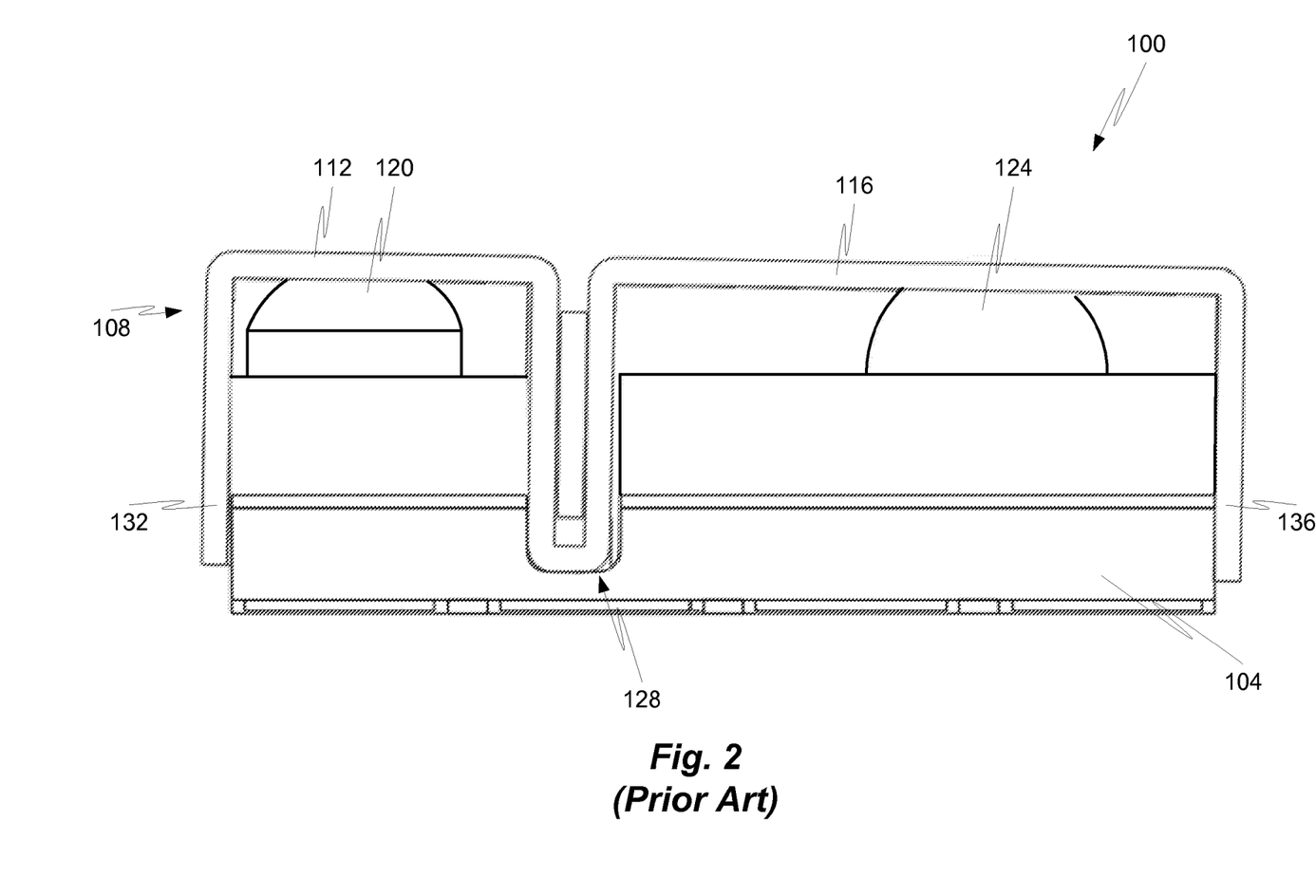
FIG. 2 is a cross-sectional side view of an optical proximity sensor having an unwanted tilt in accordance with embodiments of the prior art.

As can be seen in FIG. 2, one issue which may arise with the optical proximity sensor 100 is that if the outer sidewalls 132, 136 of the modules 112, 116, respectively, (i.e., the sidewalls which oppose the inner sidewalls or u-bend feature 128) are not machined to fit snugly around the substrate 104, then the housing 108 may be prone to unwanted tilting. More specifically, if even a minor gap is present between one of the outer sidewalls 132, 136 and the outer edge of the substrate 104, then the u-bend feature 128 may act as a pivot point for the housing 108, which leads to unwanted tilting of the housing 108 with respect to the substrate 104. Minor gaps may occur even if the housing 108 and substrate 104 are within manufacturing tolerances. In particular, if the housing 108 is at the high end of its manufacturing tolerance and the substrate 104 is at the lowest end of its manufacturing tolerance, a gap is created which can allow even more tilt to occur.

Tilting of the housing 108 relative to the substrate 104 can have negative side effects including causing damage to the optical components 120, 124 of the optical proximity sensor 100 as well as leading to an unwanted shape and size of the optical proximity sensor 100. If the optical proximity sensor 100 is improperly sized or has an improper shape, the optical proximity sensor 100 may not be suitable for its intended application and may, therefore, be labeled as defective.

Other types of optical proximity sensors which are known in the art include, without limitation, those designed and manufactured by AVAGO TECHNOLOGIES™ such as HSDL-9100 surface-mount proximity sensors, APDS-9101 integrated reflective sensors, APDS-9120 integrated optical proximity sensors, APDS-9700, APDS-9800, etc.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 3:
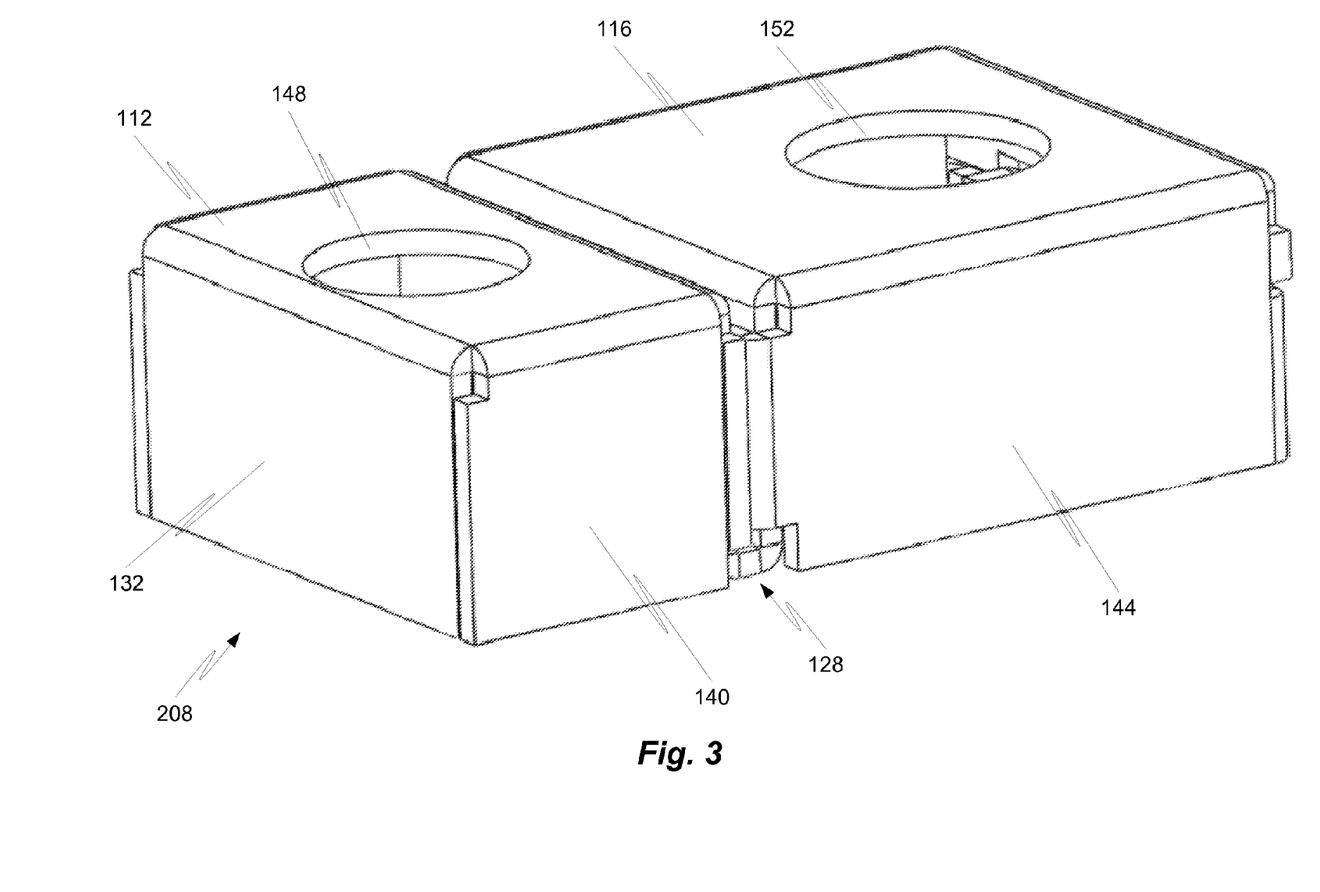
FIG. 3 is a first perspective view of an optical proximity sensor housing in accordance with embodiments of the present disclosure.
Figure 4:
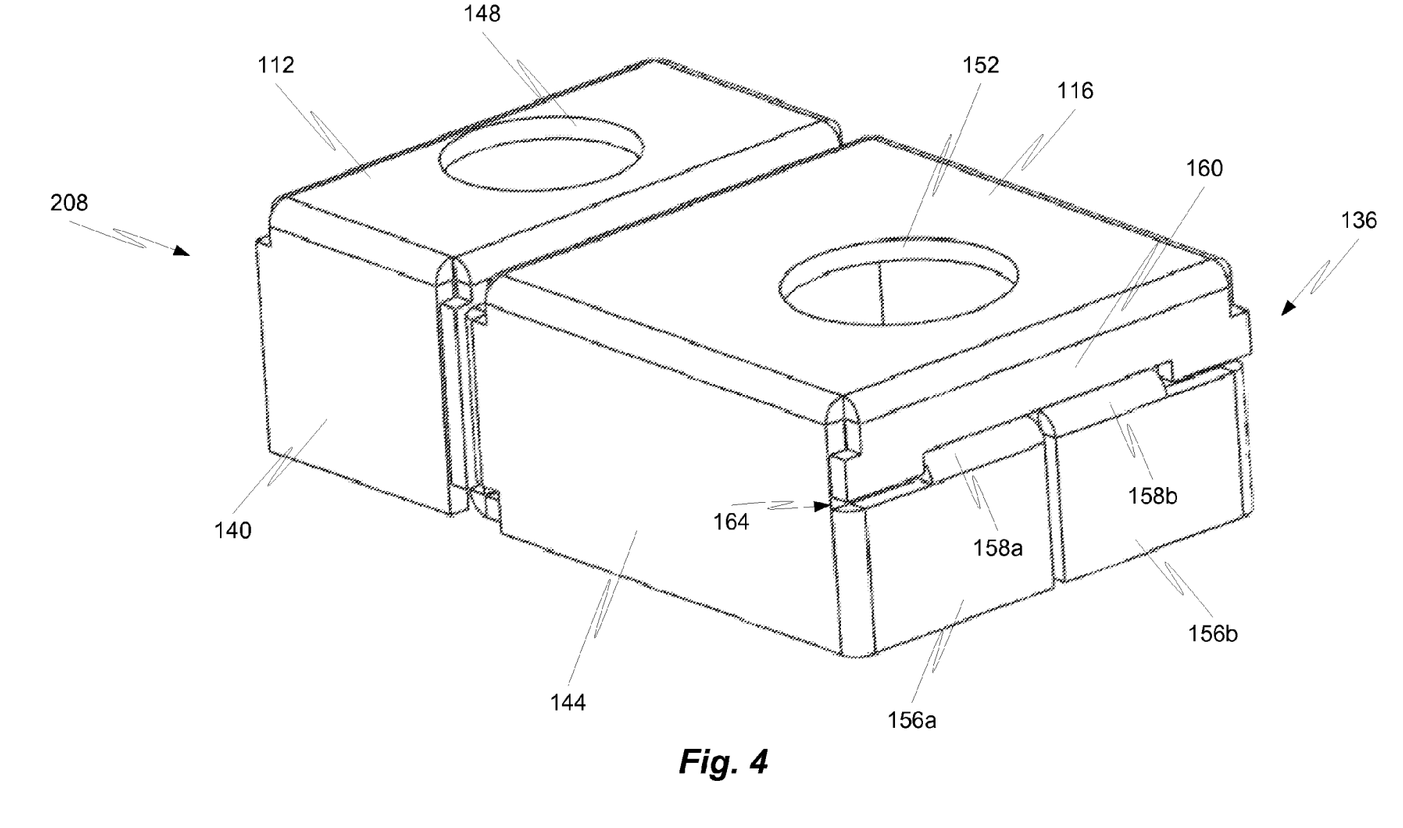
FIG. 4 is a second perspective view of an optical proximity sensor housing in accordance with embodiments of the present disclosure.

With reference now to FIGS. 3-6, a housing 208 for use with an optical proximity sensor will be described in accordance with at least some embodiments of the present disclosure. FIGS. 3 and 4 show two perspective views of an optical proximity sensor housing 208 in accordance with embodiments of the present disclosure. The housing 208, in some embodiments, is constructed of an optically opaque material. In some embodiments, the housing 208 is constructed of a single piece of material by folding a number of tabs until at least two individual modules 112, 116 have been created. The material chosen to construct the housing 208 may vary depending upon the application in which the optical proximity sensor is to be employed and other design considerations. In some embodiments, the housing 208 may be constructed of a single piece of metal, metal alloy, or similar compound. As some examples, the housing 208 may be constructed of mild steel, stainless steel, nickel-plated steel stock, aluminum, or the like. In some embodiments, the housing 208 may be constructed of a non-metal material. Specifically, any type of polymer may be used which is optically opaque and suitably pliable such that it can be formed to form the modules 112, 116. Alternatively, a polymer may be injection molded or machined into the appropriate form of the housing 208 rather than folding a single sheet of material. Similarly, metal may be cast into the appropriate form of the housing 208 rather than folding a single sheet of material. Still further in the alternative, rather than folding a single sheet of material, multiple pieces of material may be glued, welded, clamped, or otherwise connected to one another to achieve the appropriate form of the housing 208. In embodiments where a single sheet of material is used, any number of different techniques for establishing the initial features of housing in the sheet of material may be used, such as laser cutting, melting with arc welders, mechanical abrasion or cutting, and so on.

In some embodiments, the folding methods used to construct the housing 208 may be similar to those described in U.S. Patent Publication No. 20100282951 to Costello et al., the entire contents of which are hereby incorporated herein by reference. Specifically, the housing 208 may be constructed from a single sheet of material (metal or non-metal) that comprises a plurality of tabs which are sequentially folded until the desired form of the housing 208 is achieved.

In embodiments where a tab-based folding approach is used to manufacture the housing 208, a number of tabs may be provided which ultimately become a specific feature of the housing 208. As can be seen in FIGS. 3 and 4, the housing 208 may comprise a first module 112 and an adjacent module 116. The first module 112, in some embodiments, may comprise a top surface and four sidewalls. The top surface may comprise a first aperture 148 which is designed to allow light to enter and/or exit the cavity of the first module 112 (depending upon whether the first module 112 contains a light source or a light detector) in a predetermined fashion.

The four sidewalls of the first module 112 may include an outer sidewall 132, two lateral sidewalls 140 extending orthogonally from the outer sidewall 132, and an inner sidewall that is included as part of a u-bend feature 128. In some embodiments, the four sidewalls are configured in a rectangular or square shape, thereby creating a box or cube-shaped first module 112. As can be appreciated, however, the first module 112 may be configured in other shapes without departing from the scope of the present disclosure. In particular, the first module 112 may be configured as a cylinder, an elongated cylinder (e.g., having an elliptical cross-section), a sphere, or a polygonal structure having more than four sidewalls. Accordingly, although the first module 112 is depicted as having four sidewalls, the first module 112 may have a greater or lesser number of sidewalls without departing from the scope of the present disclosure.

In some embodiments, the sidewalls of the first module 112 may each correspond to a separate tab feature that has been folded. In some embodiments, the inner sidewall of the first module 112 may comprise a plurality of tabs that form some or all of the u-bend feature 128. Furthermore, although the feature 128 is referred to herein as a u-bend feature 128, one of ordinary skill in the art will appreciate that the feature 128 may be provided in any other shape (i.e., other than a "u" shape). The term "u-bend feature" is used herein primarily for ease of discussion.

The lateral sidewalls 140 and outer sidewall 132 may correspond to tabs which were originally formed in a "T shape" with the top surface of the first module 112. Each of the lateral sidewalls 140 and outer sidewall 132 may have been folded downwardly from the top surface of the first module 112 to form the cavity of the first module 112. Similarly, the tabs used to form the inner sidewall may correspond to a first tab also extending from the top surface of the first module 112 as well as one or more additional tabs that were either extensions of the lateral sidewalls 140 or the first tab of the inner sidewall extending from the top surface. In other words, tabs extending from the lateral sidewalls 140 may be used to also form the inner sidewall and, therefore, the u-bend feature 128.

Similar to the first module 112, the second module 116 may comprise a top surface and four sidewalls, although a greater or lesser number of sidewalls may be used to construct the second module 116. The top surface of the second module 116 may comprise a second aperture 152 which is designed to allow light to enter and/or exit the cavity of the second module 116 (depending upon whether the second module 116 contains a light source or light detector) in a predetermined fashion.

The four sidewalls of the second module 116 may include an outer sidewall 136, two lateral sidewalls 144 extending orthogonally from the outer sidewall 136, and an inner sidewall that is included as part of the u-bend feature 128. The inner sidewalls of the first and second modules 112, 116 may be adjacent to one another and may also be parallel to one another. Similarly, the lateral sidewalls 140 of the first module 112 may be parallel with or in the same plane as the lateral sidewalls 144 of the second module 116. The outer sidewall 132 of the first module 112 may be parallel to the outer sidewall 136 of the second module 116. Thus, the housing 208 may have a generally rectangular shape, although other housing shapes may be employed.

Similar to the first module 112, the sidewalls of the second module 116 may each correspond to a separate tab feature that has been folded. In some embodiments, the inner sidewall of the second module 116 may comprise a plurality of tabs that form some or all of the u-bend feature 128. In some embodiments, the u-bend feature 128 is constructed of an equal number of tabs from the first module 112 and the second module 116. In other words, the number of tabs in the u-bend feature 128 that are attributable to the first module 112 equal the number of tabs in the u-bend feature 128 that are attributable to the second module 116. Thus, the construction of the inner sidewalls of the first and second modules 112, 116 may be symmetrical. Alternatively, more tabs in the u-bend feature 128 are attributable to either the first module 112 or second module 116. Also similar to the first module 112, the lateral sidewalls 144 may correspond to tabs that have been folded downwardly from the top surface of the second module 116 to form the cavity of the second module 116.

One difference between the first module 112 and second module 116 is that the second module 116 may be provided with a multi-part outer sidewall 136. More specifically, the outer sidewall 136 of the second module 116 may comprise a plurality of tabs which can be folded to form the cavity of the second module 116 as well as create a second support member for the housing 208 to interface with a substrate 104. In some embodiments, the outer sidewall 136 of the second module 116 may comprise first and second bottom tab portions 156a, 156b which extend and fold from the lateral sidewalls 144. The first and second bottom tab portions 156a, 156b may also have support extensions 158a, 158b. The first and second support extensions 158a, 158b may be designed to fold into the cavity of the second module 116 to form a support member for the housing 208 rather than forming a wall of the second module 116. In some embodiments, the outer sidewall 136 of the second module 116 may further comprise a top tab portion 160 which extends from the top surface of the second module 116. The top tab portion 160 may have a length that is less than the length of any lateral sidewalls 140, 144. The top tab portion 160 in combination with the first and second bottom tab portions 156a, 156b may form the portion of the outer sidewall 136 which defines the boundaries of the cavity of the second module 116.

As can be seen in FIG. 4, a gap 164 may be provided between the top tab portion 160 and the bottom tab portions 156a, 156b when folded. The gap 164 is provided as a mechanism for allowing some variances in machining of the housing 208. Specifically, the top tab portion 160, the bottom tab portions 156a, 156b, and their support extensions 158a, 158b, do not have to be precisely manufactured to allow the first and second bottom tab portions 156a, 156b to be folded and to allow the first and second support extensions 158a, 158b to be folded into the cavity of the second module 116. In some embodiments, the support extensions 158a, 158b, and therefore the gap 164, are strategically placed on the outer sidewall 136 of the module that is configured to receive a light detector instead of a light source. Thus, any light which reaches the light detector from the light source reaches the light detector via the second aperture 152. In some embodiments, the size of the gap 164 can range between about 50 microns to about 100 microns.

As can be appreciated by those of ordinary skill in the art, the outer sidewall 136 of the second module 116 may have a greater or lesser number of tabs. Specifically, as one example, the outer sidewall 136 may comprise only a single bottom tab portion 156 which has one or more support extensions 158. As another example, support extensions may be provided as part of the top tab portion 160 rather than the bottom tab portions 156a, 156b. Thus, the top tab portion 160 may fold downwardly from the top surface of the second module 116 and then be folded a second time into the cavity of the second module 116.

In the embodiment depicted where the support extensions 158a, 158b are provided on the bottom tab portions 156a, 156b, the order of folding operations for creating the outer sidewall 136 are as follows. The following order of operations may occur before or after the u-bend feature 128 has been created and/or before, during, or after the first module 112 has been created. First, the lateral sidewalls 144 are folded downwardly from the top surface of the second module 116. Second, the bottom tab portions 156a, 156b are folded inwardly until they are substantially parallel with the edge of the top surface that meets the top tab portion 160. Third, the support extensions 158a, 158b are folded inwardly toward the cavity of the second module 116. In some embodiments, the support extensions 158a, 158b are folded until they are parallel with the top surface of the second module 116. Finally, the top tab portion 160 is folded downwardly from the top surface of the second module 116 until it is parallel with or in the same plane as the first and second bottom tab portions 156a, 156b.

Figure 5:
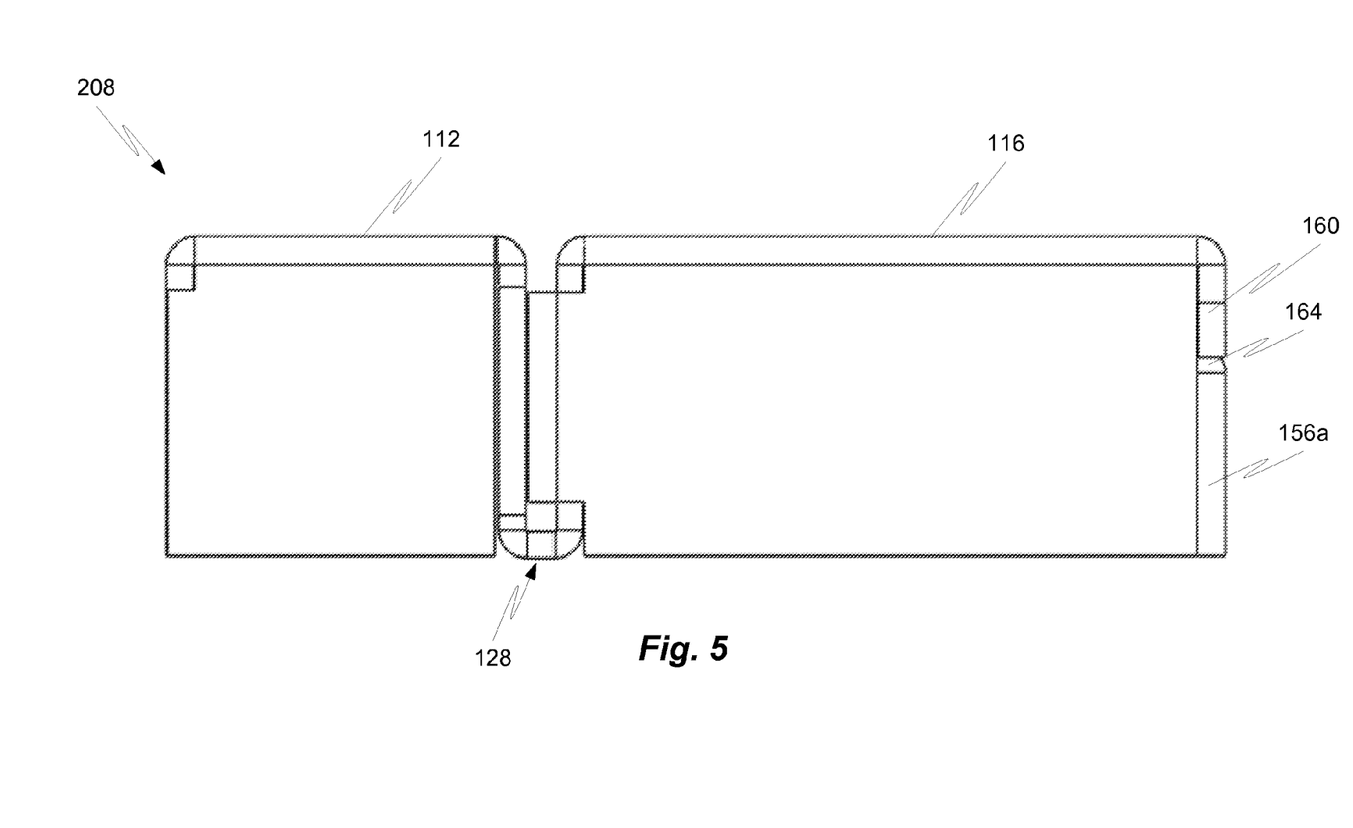
FIG. 5 is a side view of an optical proximity sensor housing in accordance with embodiments of the present disclosure.

FIG. 5 shows a side view of a completed housing 208 in accordance with at least some embodiments of the present disclosure. As can be seen in FIG. 5, the bottom of the u-bend feature 128 may be in the same plane as the bottom of the other sidewalls of the first and second modules 112, 116.

Figure 6:
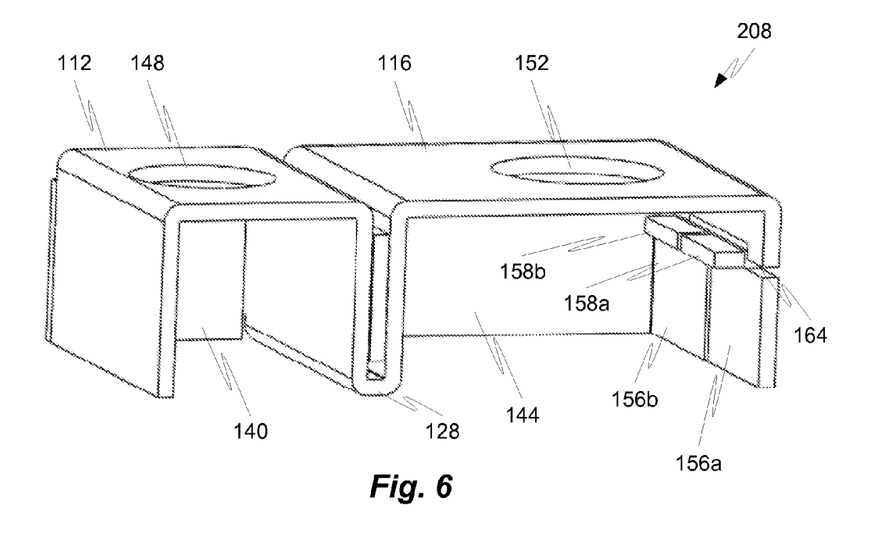
FIG. 6 is a cross-sectional perspective view of an optical proximity sensor housing in accordance with embodiments of the present disclosure.

The cross-sectional view of the completed housing 208 in FIG. 6 shows how the support extensions 158a, 158b extend into the cavity of the second module 116. In some embodiments, the length of a support extension 158a or 158b should be no longer than the total finished height of the housing 208 less the height of a bottom tab portion 156a or 156b. In some embodiments, the length of a support extension 158a or 158b should be no longer than the total finished height of the housing 208 less the height of a bottom tab portion 156a or 156b and less the thickness of the top surface of the second module 116.

Figure 7:
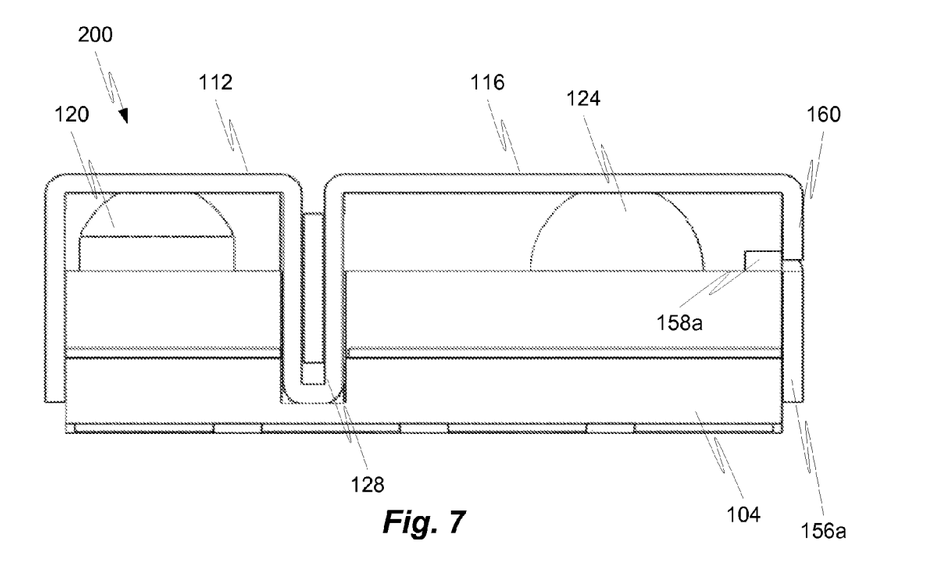
FIG. 7 is a cross-sectional side view of an optical proximity sensor in accordance with embodiments of the present disclosure.

Referring now to FIG. 7, an optical proximity sensor 200 will be described in accordance with at least some embodiments of the present disclosure. The optical proximity sensor 200 comprises a substrate 104 and housing 208 as described with reference to FIGS. 3-6. The optical proximity sensor 200 may also comprise a light source 120 and a light detector 124 mounted on the substrate 104.

The substrate 104 may correspond to a Printed Circuit Board (PCB) that receives the light source 120 and light detector 124 as well as electronics for controlling operations of the optical proximity sensor 200.

The light source 120 may comprise any type of device capable of generating and transmitting light at one or more wavelengths. Suitable examples of a light source 120 include, without limitation, a Light Emitting Diode (LED), an infrared LED, a laser diode, or any other light-emitting device, array of light-emitting devices, or the like. One specific example of the light source 120 is a P/N mesa-type AlGaAs/GaAs infrared chip, manufactured by TYNTEK, having model number TK 114IRA.

The light detector 124 may comprise any type of device, such as a photodetector, that is capable of receiving light energy and converting it into an electrical signal. Suitable examples of a light detector 124 include, without limitation, a PIN diode, a photo-diode, and a phototransistor. One specific example of the light detector 124 is a photodiode chip manufactured by TYNTEK having model number TK-043PD.

The housing 208 effectively minimizes or eliminates crosstalk between the light source 120 and light detector 124. Thus, the light detected by the light detector 124 should substantially correspond to light transmitted by the light source 120 that has exited the first aperture 148, reflected off of an object of interest, and entered the second aperture 152.

The housing 208 also provides a structural component of the optical proximity sensor 200 that protects the light source 120, light detector 124, and any other electrical or sensitive componentry mounted on the substrate 104. More specifically, the u-bend feature 128 and support extensions 158a, 158b provide multiple points of contact between the housing 208 and the substrate 104. The support extensions 158a, 158b help to minimize unwanted tilting of the housing 208 with respect to the substrate 104. Moreover, the support extensions 158a, 158b in combination with the u-bend feature 128 help to distribute forces imparted on the optical proximity sensor 200 during manufacture or use. In particular, vertical forces may be applied to the first and/or second modules 112, 116 of the housing 208 during manufacture of the optical proximity sensor 200. Stress testing of the housing 208 has indicated that the maximum displacement of the top surface of both modules 112, 116 occur around the apertures 148, 152. During the above-noted testing, a 5N vertical load was applied to the top surface of the second module 116 and the outer edge of the second module 116 was only displaced by 0.004 mm. Under a 20N similarly situated vertical load, the outer edge of the second module 116 was only displaced by 0.015 mm, which is still an acceptable amount of displacement and tilt for most applications. Because the support extensions 158a, 158b rest on the top surface of the substrate 104, the housing 208 does not have to be precisely manufactured to have a snug fit with the substrate.

Once the housing 208 has been formed, the light source 120 and light emitter driving circuitry may be mounted in the first module 112. Similarly, the light detector 124 and light sensing circuitry may be mounted in the second module 116. The substrate 104 may then be disposed beneath the housing 208 and operably connected to the light emitter driving circuit and light sensing circuit to yield an operative proximity sensor 200. The completed optical proximity sensor 200 may be incorporated into any number of devices, such as a cellular phone, a Personal Digital Assistant (PDA), a laptop computer, a notebook computer, a desktop computer, a netbook, a tablet device, an electronic book reader, or the like.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An optical proximity sensor, comprising:
   a light source;
   a light detector;
   a substrate upon which the light source and light detector are mounted; and
   a housing, comprising:
      a first module comprising a first aperture and comprising a cavity to receive the light source;
      a second module comprising a second aperture and comprising a cavity to receive the light detector;
      a first support feature provided between the first module and second module, the first support feature providing an interface between the housing and the substrate and being configured to enable the first and second module to pivot relative to the substrate by transferring a vertical force applied to the second module to the first module; and
      a second support feature provided in the cavity of at least one of the first and second modules, the second support feature configured to counteract the pivot motion enabled by the first support feature, thereby minimizing tilting of the housing relative to the substrate.

2. The optical proximity sensor of claim 1, wherein the housing is constructed of a single piece of material.

3. The optical proximity sensor of claim 2, wherein the single piece of material comprises at least one of a metal and metal alloy.

4. The optical proximity sensor of claim 2, wherein the single piece of material comprises a non-metal.

5. The optical proximity sensor of claim 1, wherein the first support feature comprises at least one tab foldably disposed between the first module and second module.

6. The optical proximity sensor of claim 1, wherein the second support feature is a folded tab provided in the cavity of the second module.

7. The optical proximity sensor of claim 1, wherein the second module comprises an inner sidewall, two lateral sidewalls adjacent to the inner sidewall, and an outer sidewall, wherein each of the sidewalls comprise one or more tabs which extend from an outer surface of the second module and are folded toward the cavity of the second module.

8. The optical proximity sensor of claim 7, wherein the second support feature comprises one or more foldable tabs included in the outer sidewall.

9. The optical proximity sensor of claim 7, wherein the outer sidewall comprises at least one bottom tab portion and at least one top tab portion, wherein the at least one bottom tab portion comprises a foldable extension of at least one of the two lateral sidewalls, wherein the second support feature comprises a foldable extension of the at least one bottom tab portion, and wherein the at least one top tab portion extends from the outer surface of the second module that opposes the cavity of the second module.

10. The optical proximity sensor of claim 9, wherein the outer sidewall comprises a gap between the at least one top tab portion and at least one bottom tab portion.

11. The optical proximity sensor of claim 1, wherein the first and second modules comprise optically opaque inner sidewalls to provide optical isolation between the first and second modules.

12. The optical proximity sensor of claim 1, further comprising:
   a light source driver circuit operably connected to and driving the light source, wherein the light source driver circuit is mounted on the substrate and is received by the first module; and
   a detector sensing circuit operably connected to and driving the light detector, wherein the detector sensing circuit is mounted on the substrate and is received by the second module.

13. A housing for an optical proximity sensor having a substrate upon which a light source and light detector are mounted, the housing comprising:
   a first module comprising a first aperture and a cavity configured to receive a light source;
   a second module comprising a second aperture and a cavity configured to receive a light detector;
   a first support feature provided between the first module and second module, the first support feature configured to interface with a substrate and transfer vertical forces applied to the second module to the first module thereby enabling a pivoting motion of the first and second module relative to the substrate; and
   a second support feature provided in the cavity of at least one of the first and second modules, the second support feature configured to counteract the pivoting motion enabled by the first support feature, thereby minimizing tilting of the first and second modules about the substrate.

14. The housing of claim 13, the second support feature inhibits the pivoting motion.

15. The housing of claim 13, wherein the first module is connected to the second module via the first support feature.

16. The housing of claim 15, wherein the first support feature comprises a plurality of tabs that are folded and separate the first and second modules so as to substantially inhibit optical cross-talk between the first and second modules.

17. The housing of claim 16, wherein the housing is constructed from a single piece of an optically opaque material.

18. The optical proximity sensor of claim 1, wherein the second support feature inhibits the pivoting motion.

19. The housing of claim 13, wherein the second module comprises an inner sidewall, two lateral sidewalls adjacent to the inner sidewall, and an outer sidewall, wherein each of the sidewalls comprise one or more tabs which extend from an outer surface of the second module and are folded toward the cavity of the second module.

20. The housing of claim 19, wherein the outer sidewall comprises at least one bottom tab portion and at least one top tab portion, wherein the at least one bottom tab portion comprises a foldable extension of at least one of the two lateral sidewalls, wherein the second support feature comprises a foldable extension of the at least one bottom tab portion, and wherein the at least one top tab portion extends from the outer surface of the second module toward the cavity of the second module.

* * * * *